United States Patent [19]

Sturgess et al.

[11] 4,080,876
[45] Mar. 28, 1978

[54] SPRING-FORCE APPLYING MEANS

[75] Inventors: Philip Alan Sturgess; Keith William Langley, both of London, England

[73] Assignee: Westinghouse Brake & Signal Co. Ltd., England

[21] Appl. No.: 749,709

[22] Filed: Dec. 10, 1976

[30] Foreign Application Priority Data

Dec. 17, 1975 United Kingdom ............... 51562/75

[51] Int. Cl.² .............................................. F01B 9/00
[52] U.S. Cl. .......................................... 92/29; 92/33; 92/130 A; 188/170; 192/91 R
[58] Field of Search ...................... 188/170; 92/17, 29, 92/63, 113, 129, 130 A; 192/91 R; 303/6 M

[56] References Cited

U.S. PATENT DOCUMENTS

| 3,704,653 | 12/1972 | Higgins | 188/170 X |
| 3,782,251 | 1/1974 | Marchand | 92/63 |
| 3,943,829 | 3/1976 | Newstead et al. | 188/170 X |
| 3,994,205 | 11/1976 | Ekdahl et al. | 188/170 X |
| 3,994,206 | 11/1976 | Dahlkvist et al. | 188/170 |

Primary Examiner—George E. A. Halvosa
Attorney, Agent, or Firm—Larson, Taylor and Hinds

[57] ABSTRACT

A spring brake actuator is proposed which is provided with an arrangement accessible from the outside for manually releasing the brake in the absence of fluid pressure to release it, the releasing arrangement comprising a member which rotates a splined force applying member relative to a force transmitting member against the force of a return spring which holds abutting ends of the splines of the elements mutually aligned.

5 Claims, 1 Drawing Figure

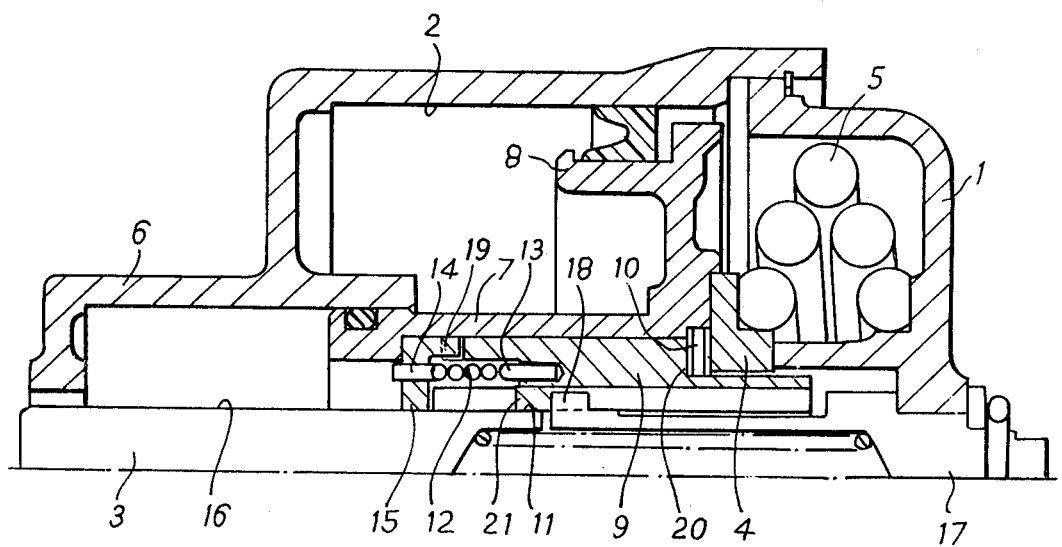

SPRING-FORCE APPLYING MEANS

This invention relates to spring force applying means and relates especially but not exclusively to spring brake actuators.

Typical spring brake actuators have a spring which exerts its force across a pair of members relative displacement of which in one direction under the influence of the spring enables the spring to apply a force to a force transmitting element and a fluid pressure responsive member which with an appropriate differential fluid pressure across it can exert a force opposing the force exerted by the spring whereby the members are relatively displaced in the opposite direction at least partially to relieve the force transmitting element of the force applied thereto by the spring. Such spring-force applying means will hereinafter be referred to as of the type described.

Spring-force applying means of the type described can be used as brake actuators for applying the brakes of either a road or a rail vehicle. Such brake actuators may be the sole form of brake-applying means or may be additional to conventional fluid-pressure or electrically operated brake-applying means as an emergency and/or secondary brake applying means.

The present invention provides a spring-force applying means of the type described the one said member having a trunk portion sealingly slideable in the other member the force transmitting element and a force applying element being contained at least partially in said trunk portion, the force-transmitting element being such that in a first angular relationship between it the force applying element, it is mutually engageable therewith to be able to transmit the force of the spring and in a second angular relationship it is mutually disengaged therewith so that the elements are axially movable at all times one with the other to be unable to transmit the force of the spring and means being provided which is operable from externally of the pair of members to effect such mutual disengagement of the elements.

Preferably, the force transmitting element and the force applying element are resiliently angularly relatively biassed towards the first angular relationship.

Preferably the force applying element is provided with an abutment face which in the first angular position is engaged with a corresponding face on the force transmitting element, and the force applying element being provided with one or more internal splines one or each of which provides said abutment face at its end and in the second angular relationship is or are engageable with a corresponding end of an external spline or splines on the force transmitting element. The force applying element is also provided with a further abutment to permit relative angular movement with the force transmitting element. The manually operable means may comprise a further element which extends axially inside the force applying element for angular engagement therewith whilst permitting axial movement relative thereto.

The said further element may have an external spline similar to that of the force transmitting element to permit the angular engagement whilst permitting said axial movement.

In order that the present invention may be more clearly understood and readily carried into effect, the same will be further described by way of example with reference to the accompanying drawing the single FIGURE of which illustrates in diagrammatical form a semi-view of a spring-brake actuator employing spring-force applying means in accordance with one embodiment of the invention.

Referring to the drawing, the spring-brake actuator comprises a main housing consisting of a first member 1, in the form of a cover enclosing a cylinder 2 from one end of which there is extendable a force transmitting element 3 which in the present instance is assumed in operation to be connected to a brake-operating rigging. Within the housing there is a second member 4 between which and the first member 1 there is retained a force exerting spring denoted by reference 5 and which in the position shown is illustrated in a compressed and force applying condition. The force is thus exerted between the first member 1 and the second member 4. Sealingly slideable within a trunk portion 6 of the cylinder 2, there is provided a tubular shaft or rod 7 formed integrally with a pressure responsive member in the form of a piston 8 which is sealingly slideable in the cylinder 2. The other end of the piston 8 abuts the second member 4 such that when fluid pressure is applied to the cylinder 2 via a pressure input port which is not shown, the force of the spring on the second member 4 can at least be counteracted. Within the tubular piston rod 7, there is carried a force applying element which itself is also of tubular form and is denoted by reference 9. The force applying element 9 has a substantial shoulder 20 between which and the second member 4 there is a thrust bearing 10 thereby permitting relative rotational movement as between the force applying element and the member 4. The force applying element is further provided with an abutment face 21 and an internal spline 11. Further, the force transmitting element 3 is also provided with an abutment face and external splines which according to the relative angular relationship therebetween, either abut the faces of the force applying element or permit axial sliding movement one within the other. As shown in the drawing the force applying element 9 and the force transmitting element 3 are relatively resiliently urged into a position in which the splines engage one another such as shown in the drawing by a torque spring denoted by reference 12 one end 13 of which engages a drilling in the force applying element 9 and the other end 14 of which engages a drilling in a collar member 15 which fits over the force transmitting element 3 and is retained axially relative thereto by engagement with a D-shaped milling along the surface 16 thereof. It will be noted also that this D-shaped milling provides means whereby the force transmitting element 3 is restrained against angular rotation in the trunk 6 of the cylinder whilst at the same time permitting the necessary axial movement relative thereto. A further element 17 is housed in the end 1 of the actuator and is provided with splines 18 similar to the splines 11 of the force applying element 9. This element 17 provides manually operable means which is operable from outside the actuator to effect relative angular movement between the force transmitting element 3 and the force applying element 9.

In operation of the spring brake actuator shown in the drawing, in the position shown, assuming that fluid pressure is released from the cylinder 2, the full force of the spring 5 is exerted between the members 1 and 4. The pressure on the member 4 is thus in its turn exerted via the thrust bearing 10 to the force applying element 9 by which the force is applied to the force transmitting element 3 via the abutment face 21. It will be noted moreover that the torque spring 12 operates in such a sense as to maintain these elements in this angular relationship.

In the event that it is required to release the force exerted by the force transmitting element, for example in order to change the brake block on a particular brake mechanism in a train of vehicles, whilst retaining all other brakes applied, rotation of the manually operable means 17 in the appropriate angular sense, can effect release of the mechanism. This is achieved by virtue of the engagement between the splines 18 and the splines 11 of the force applying element thereby rotating the force applying element by a sufficient amount limited by abutments (indicated at 19 between the force applying element 9 and the collar 15) to effect both axial disengagement of the abutment face 21 and alignment of the splines and permit relative axial movement between the force applying element and the force transmitting element. The force of the spring acting on the member 4 therefore causes the force applying element to move to the left relative to the force exerting element thereby releasing the force of the spring from the latter. Any necessary mechanical attention can therefore be applied to the brake rigging and on subsequent repressurisation of the cylinder 2, the piston 8 moves again to the right until the point is reached where the splines come out of disengagement and the angular movement into the axial engaged position is effected by the torque spring 12 such that the condition which is shown is recovered.

Whilst only single splines are visible on the force transmitting element, the force applying element and the further element 17, it will be appreciated that a plurality of radially spaced splines may be provided in these elements to afford option areas of abutting surfaces and correspondingly adequate robustness having regard to the rigours of operation and the forces involved.

Having thus described our invention what we claim is:

1. In a spring-force applying means comprising a housing member having an outer cylindrical shell and a hollow, elongated trunk portion of reduced radius relative to the shell, first and second relatively displaceable members at least partially located within said housing member, a force transmitting element located at least partially within said trunk portion, a spring which exerts the force thereof across said first and second members so as to cause relative displacement between said members in one direction and to thereby enable the spring to apply a force to said force transmitting element, and a fluid pressure responsive member located within said housing member which, responsive to a predetermined differential fluid pressure thereacross, exerts a force opposing the force exerted by said spring so that said first and second members are relatively displaced in a direction which is opposite to said one direction such as to at least partially relieve said force transmitting element of the force applied thereto by the spring, the improvement wherein said pressure responsive member includes a tubular portion sealingly slideable within said trunk portion of the housing member, the force transmitting element being contained at least partially in said tubular portion, said spring-force applying means further comprising a force applying element separate from, and capable of movement relative to, said pressure responsive member and said force transmitting element and contained at least partially within said tubular portion, said force-transmitting element including means for providing, in a first angular relationship between said force transmitting element and the force applying element, mutual engagement with said force applying element so as to enable transmission of the force of the spring and for providing, in a second angular relationship between said elements, mutual disengagement of said elements so that the elements are axially movable at all times, one with respect to the other, and are unable to transmit the force of the spring, and means operable from externally of said first and second members for engaging said force applying element to effect such mutual disengagement of the elements, said force applying element including an abutment face which in the first angular relationship is engaged with a corresponding abutment face on the force transmitting element, and the force applying element including at least one internal spline which provides said corresponding abutment face at the end thereof and in the second angular relationship is engageable with a corresponding end of an external spline on the force transmitting element.

2. A spring force applying means as claimed in claim 1, further comprising means for resiliently angularly biasing the force transmitting element and the force applying element towards the first angular relationship.

3. A spring force applying means as claimed in claim 1 wherein the force applying element also includes a further abutment to permit relative angular movement with the force transmitting element.

4. A spring force applying means as claimed in claim 1, wherein the externally operable means comprise a further element which extends axially inside the force applying element for angular engagement therewith while permitting axial movement relative thereto.

5. A spring force applying means as claimed in claim 4, wherein said further element further includes an external spline for permitting said angular engagement while permitting said axial movement.

* * * * *